United States Patent
Malkin et al.

(10) Patent No.: US 10,783,557 B2
(45) Date of Patent: Sep. 22, 2020

(54) HOME LOCATION IDENTIFICATION USING GROUPED LOCATION DATA

(71) Applicant: Yahoo Holdings, Inc., Sunnyvale, CA (US)

(72) Inventors: Jonathan Malkin, Sunnyvale, CA (US); Csaba Kecskemeti, Sunnyvale, CA (US)

(73) Assignee: Oath Inc., New York, NY (US)

( * ) Notice: Subject to any disclaimer, the term of this patent is extended or adjusted under 35 U.S.C. 154(b) by 647 days.

(21) Appl. No.: 15/331,083

(22) Filed: Oct. 21, 2016

(65) Prior Publication Data

US 2018/0114249 A1    Apr. 26, 2018

(51) Int. Cl.
*G06Q 30/02*    (2012.01)

(52) U.S. Cl.
CPC ................. *G06Q 30/0261* (2013.01)

(58) Field of Classification Search
None
See application file for complete search history.

(56) References Cited

U.S. PATENT DOCUMENTS 8,438,233 B2 * 5/2013 Mallet ............... G06Q 50/01
709/206

OTHER PUBLICATIONS

"K-means clustering versus validation measures: a data-distribution perspective", Hui Xiong, Apr. 2009 (Year: 2009).*
Kiri Wagstaff et al., "Constrained K-means Clustering with Background Knowledge", Proceedings of the Eighteenth International Conference on Machine Learning, 2001, p. 577-584.

* cited by examiner

*Primary Examiner* — Alexandru Cirnu
(74) *Attorney, Agent, or Firm* — Cooper Legal Group, LLC

(57) ABSTRACT

An electronic system may be configured receive a set of location-based events and form the location-based events into a plurality of groups. The location-based events identify user devices that transmitted messages over the network and physical locations of the user devices when the messages were generated. The groups may be formed based on the physical locations and the number of groups to be formed. In some embodiments, the system may use k-means clustering to form the groups. The system may analyze the groups to determine a home location of at least some of the user devices identified in the set.

20 Claims, 9 Drawing Sheets

HOME LOCATION IDENTIFICATION USING GROUPED LOCATION DATA

BACKGROUND

Where a person lives may be a strong indicator of various characteristics of that person, and thus may be useful information for an advertisement server or other similar computing device to have access to when selecting content to send to that person's device. However, due to laws and regulations, servers or other computing devices that select content to send to devices may not have access to certain databases that contain home address information. For example, users of devices may have online accounts through various websites that identify personal information—e.g., names, home addresses, telephone numbers, credit card numbers, etc.—which may be unavailable to Internet-based advertisement systems or other, similar systems that may want to use a home location of a user in order to select content to send to the user's device. As such, ways to infer a user's home location using information that is available may be desirable.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Figure 1:
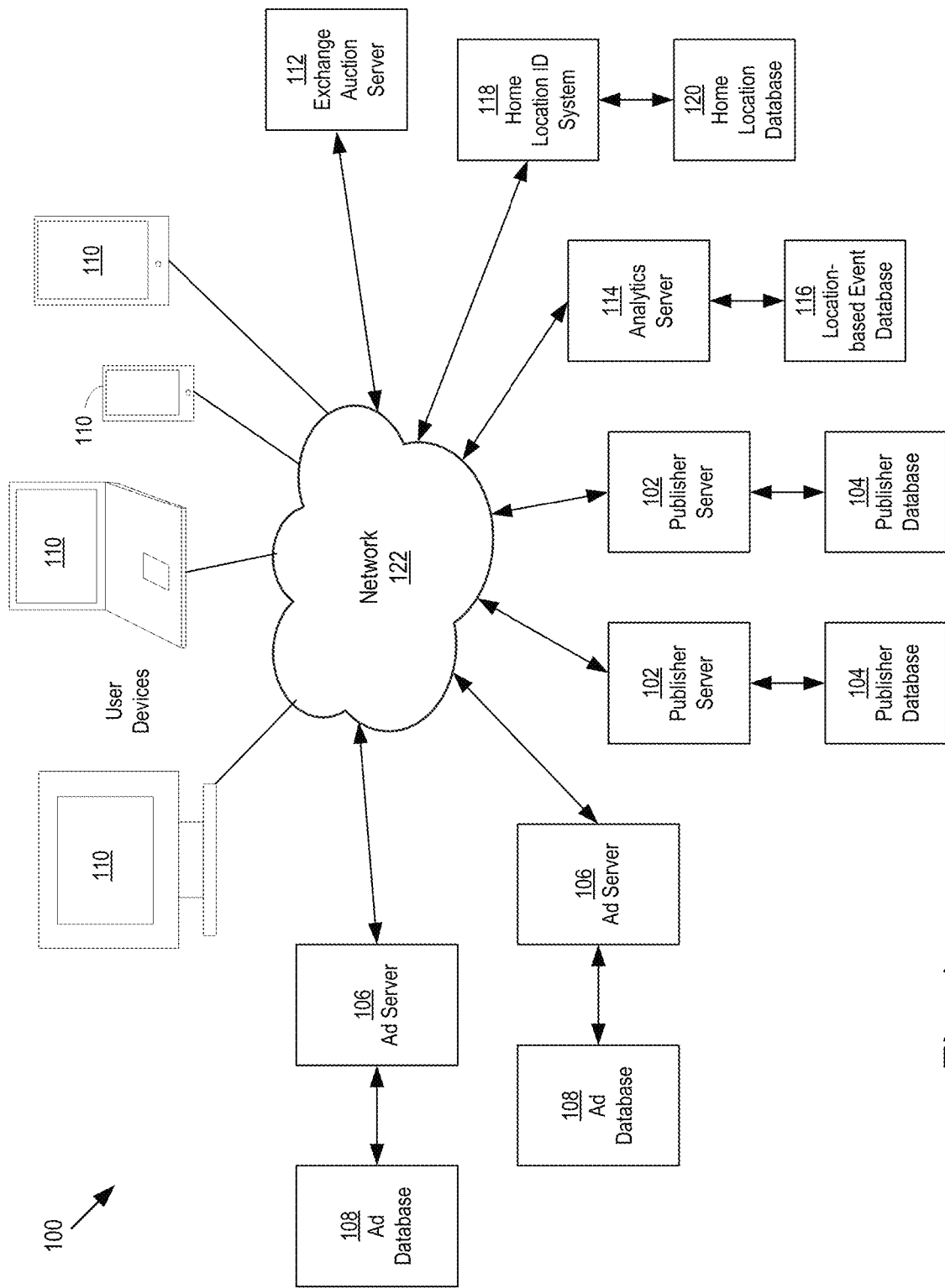
FIG. 1 is a block diagram of an example electronic system that may utilize a home location ID system that identifies a home location for one or more user devices.

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is not intended to be limiting on the scope of what is claimed.

Aspects of systems and operations, described herein, labeled as "first", "second", "third", and so on, should not necessarily be interpreted to have chronological associations with each other. In other words, such labels are used to merely distinguish aspects of the systems and operations described herein, unless the context of their use implies or expresses chronological associations.

OVERVIEW

By way of introduction, the below embodiments relate to systems and related methods of forming groups based on location-based events. In one embodiment, an electronic system includes: a memory comprising a home location database and a controller. The controller is configured to: access an event database comprising a plurality of events identifying a set of user devices and physical locations of the user devices, where each event of the plurality of events identifies a respective physical location of one of the user devices. Additionally, in response to the access, the controller is configured to group each event of the plurality of events into one of a plurality of groups based on the physical locations identified in the plurality of events. The controller is further configured to designate one of the plurality of groups as a home location group that identifies a home location of at least one user of the plurality of user devices, the designation based on a least one criterion associated with the plurality of groups; and in response to the designation, store, in a home location database, home location information that associates the home location with user devices in the set that are included in the home location group.

In another embodiment, a method includes: receiving, with a controller, a set of location-based events identifying a set of user devices and physical locations of the user devices; grouping, with the controller, the location-based events into a plurality of groups according to the physical locations identified in the location-based events and a number of groups to be formed; identifying, with the controller, one of the plurality of groups as a home location group that identifies a home location for at least one user of the user devices, the identifying of the home location group based on at least one criterion associated with the plurality of groups; storing, in a home location database, home location information that associates the home location with user devices in the set that are included in the home location group; and adding, with the controller, the home location information to user profiles associated with the user devices that are included in the home location group.

In another embodiment, one or more non-transitory computer readable storage media stores instructions executable by a computer processor. The instructions includes: instructions to identify a home location of a plurality of user devices based on location-based event group information that identifies a plurality of groups of location-based events; instructions to include the home location in user profiles associated with the plurality of user devices; instructions to identify one of the user profiles in a user profile database in response to receipt of a request for content to be displayed on one of the plurality of user devices; instructions to select a content item from a plurality of content items based on the home location included in the at least one user profile; and instructions to transmit the content item over a network to the one of the plurality of user devices.

In some embodiments, the at least one criterion comprises which of the plurality of groups has a largest number of unique device identifications.

In some embodiments, the at least one criterion comprises which of the plurality of groups has a largest number of events of the plurality of events.

In some embodiments, the at least one criterion comprises a primary criterion and a secondary criterion. The primary criterion includes which of the plurality of groups has a largest number of unique device identifications and the secondary criterion includes which of the plurality of groups has a largest number of events of the plurality of events.

In some embodiments, the at least one criterion includes which of the plurality of groups has a largest number of events occurring within a predetermined time period covering when a person is most likely to be at the home location.

In some embodiments, the controller performs k-means clustering on the plurality of events to group each event of the plurality of events into one of the plurality of groups.

In some embodiments, the controller determines whether the plurality of groups satisfies a distance criterion; in response to a determination that the plurality of groups satisfies the distance criterion, designates the plurality of groups as being a final grouping for the plurality of events; and in response to a determination that the plurality of groups does not satisfy the distance criterion, regroups the plurality of events into a new plurality of groups, where the new plurality of groups is of a different number than the plurality of groups.

In some embodiments, the controller calculates an average distance value for the plurality of groups; compares the average distance value to a distance threshold or a distance threshold range; and determines whether the plurality of groups satisfies the distance criterion based on the comparison.

In some embodiments, the plurality of events are linked to a common Internet Protocol (IP) address.

In some embodiments, the home location corresponds to a centroid of the home location group.

Other embodiments are possible, and each of the embodiments can be used alone or together in combination. Accordingly, various embodiments will now be described with reference to the attached drawings.

DESCRIPTION OF THE DRAWINGS

FIG. 1 illustrates a block diagram of an example electronic system 100 that includes example devices of a network that can communicatively couple with an example home location identification (ID) system that determines home locations for electronic user devices. The example electronic system 100 in the example of FIG. 1 includes publisher servers 102, publisher databases 104, ad servers 106, ad databases 108, user devices 110, and an exchange auction server 112. The servers and databases can be communicatively coupled over a network 122, which may be a computer network. The aforementioned may each be one or more server computers.

In the information system 100, the publisher servers 102 may provide content (also referred to as medium or electronic property) that a user device 110 wants to access and/or retrieve. Non-limiting examples of content include a website, a webpage, web-based search results provided by a search engine, a software application (app), a video game, or e-mail. Example publisher servers may include a content server or a search engine server. By providing the content, the publisher servers 102 may generate advertising inventory, which may be a supply of opportunities to display advertising in, along with, or through the provided content. The publisher server 102 may offer to sell its advertising inventory and/or send requests to submit offers or bids to buy its advertising inventory. When advertising inventory is purchased, the purchaser may obtain one or more ad impressions. Each ad impression may be a display of an advertisement (ad) with a user device 110.

A publisher server 102 may access content data or other information defining and/or associated with the content it provides either from a publisher database 104 or from another location accessible over the network 122. The publisher server 102 may communicate the content data to other devices over the network 122. Additionally, the publisher server 102 may provide a publisher front end to simplify the process of accessing the content data. The publisher front end may be a program, application or software routine that forms a user interface. In a particular example, the publisher front end is accessible as a website with electronic properties that an accessing publisher may view on a publisher device. The publisher may view and edit content data using the publisher front end.

The publisher server 102 may include logic and data operative to format the content data for communication to a user device. The content data may be formatted to a content item that may be included in a stream of content items provided to a user device 110. The formatted content items can be specified by appearance, size, shape, text formatting, graphics formatting and included information, which may be standardized to provide a consistent look for content items in the stream.

The user devices 110 may be any computing device capable of sending or receiving signals, such as via a wired connection and/or wirelessly, over the network 122. Non-limiting example user devices may include a desktop computer, a laptop computer, a smartphone, or a tablet computer, as shown in FIG. 1. The user devices 110 may vary in terms of capabilities or features. In addition, the user devices 110 may include or may execute a variety of operating systems, including a personal computer operating system, such as a WINDOWS, MAC OS X OR LINUX, or a mobile operating system, such as IOS, ANDROID, or WINDOWS MOBILE, or the like. The user devices 110 may include or may execute a variety of possible applications, such as a client software application enabling communication with other devices, such as communicating messages, such as via email, short message service (SMS), or multimedia message service (MMS), including via a network, such as a social network, including, for example, FACEBOOK, LINKEDIN, TWITTER, FLICKR, or GOOGLE+, to provide only a few possible examples. The user devices 110 may also include or execute an application to communicate content, such as, for example, textual content, multimedia content, or the like. A user device 110 may also include or execute an application to perform a variety of possible tasks, such as browsing, searching, playing various forms of content, including locally or remotely stored or streamed video, or games.

Additionally, a user device 110 may be configured to present online content items and online advertisements to a user of the user device 110. During operation, a user of a user device 110 may search for and obtain content from sources over the network 122, such as obtaining content from a publisher server 102, an ad server 106, or an exchange auction server 112. Advertisers may provide content items for placement on online properties, such as web pages, and other communications sent over the network 122 to the user devices 110.

The ad server 106 may be one or more servers. Alternatively, the ad server 106 may be a computer program, instructions, and/or software code stored on a computer-readable storage medium that runs on one or more processors of one or more servers. The ad server 106 may operate to serve advertisements (ads) to the user devices 110 for display or reception of the ads by the user devices 110. An advertisement may include data of a variety of different types, such as text data, graphic data, image data, video data, or audio data. The advertisement data may also include data defining content item information that may be of interest to a user of a user device 110. An advertisement may further include data defining links to other online properties reachable through the network 122.

The ad server 106 may include logic and data operative to format the advertisement data for communication to a user device 110. The advertisement data may be formatted for inclusion in a stream of content items and advertising items provided to a user device 110. The formatted items can be specified by appearance, size, shape, text formatting, graphics formatting and included information, which may be standardized to provide a consistent look for items in the stream. The ad server 106 may be in data communication with the ad database 108. The ad database 108 may store information, including data defining advertisements and/or advertisement creatives, to be served to the user devices 110. This advertisement data may be stored in the ad database 108 by the ad server 106 or by another data processing device.

Further, the ad server 106 may be in data communication with the network 122. The ad server 106 may communicate advertisement data and other information associated with advertisements to devices over the network 122. This advertisement data and other information may be communicated to a user device 110, such as using the ad server 106 or another advertiser device being operated by an advertiser. An advertiser operating an advertiser device may access the ad server 106 over the network 122 to access the advertisement data or other information. This access may include developing creatives, adding advertisement data, or deleting advertisement data, as non-limiting examples. The ad server 106 may then provide the advertisement data to other network devices or servers in the system 100.

The ad server 106 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 108 for subsequent communications to a user device 110. The advertiser front end may also provide a graphical user interface for simulating campaigns according to operations performed by the enhanced targeting server 116 and/or the AR lift server 130.

In addition to communicating advertisements over the network 122, the ad servers 106 may determine whether to purchase advertisement inventory and for how much. The publisher servers 102 and the ad servers 106 may participate in an auction-based marketplace in which the publisher servers 102 may serve requests (herein referred to as ad requests) for offers to buy advertisement inventory. In response, the ad servers 106 may submit bids to buy the inventory when they so choose. The bids may be submitted in a real-time bidding (RTB) format, and the ad servers 106 may be operating in the auction-based marketplace under the direct control of the advertiser, or alternatively as a representative or proxy of the advertisement, such as a demand-side platform (DSP) for example.

The auction-based market place may be conducted through the exchange auction server 112. Rather than the publisher servers 102 sending the ad requests, the exchange auction server 112 may be the network entity in the system 100 sending the ad requests. The sending of an ad request may be initiated when the opportunity of an ad impression occurs, such as when a user device 110 accesses certain content provided by a publisher server 102. For example, the user device 110 may navigate to a website or access a webpage, thus creating an opportunity for an advertisement to be displayed. The exchange auction server 112 may then send an ad request to the ad servers 106, requesting bids to purchase an ad impression for the content creating the opportunity. The ad servers 106 may determine whether they want to bid, and if they do so, may send bids to the exchange auction server 112 with their bid amounts. The exchange auction server 112 may then determine the winning bid among the submitted bids, and have the advertisement associated with the winning bid displayed on a user device 110 in conjunction with the content that created the opportunity in the first place.

The aforementioned servers and databases may be implemented through a computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include a central processing unit and memory. A server may also include a mass storage device, a power supply, wired and wireless network interfaces, input/output interfaces, and/or an operating system, such as WINDOWS SERVER, MAC OS X, UNIX, LINUX, FREEBSD, or the like.

The aforementioned servers and databases may be implemented as online server systems or may be in communication with online server systems. An online server system may include a device that includes a configuration to provide data via a network to another device including in response to received requests for page views or other forms of content delivery. An online server system may, for example, host a site, such as a social networking site, examples of which may include FLICKER, TWITTER, FACEBOOK, LINKEDIN, or a personal user site (such as a blog, vlog, online dating site, etc.). An online server system may also host a variety of other sites, including business sites, educational sites, dictionary sites, encyclopedia sites, wikis, financial sites, government sites, etc.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 122 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks that employ differing architectures or that are compliant or compatible with differing protocols may interoperate within a larger network, such as the network 122.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

Also, the described methods and systems may be implemented at least partially in a cloud-computing environment, at least partially in a server, at least partially in a client device, or in a combination thereof.

The electronic system 100 may also include an analytics server 114 in communication with a location-based event database 116. The analytics server 114 may be configured to track location-based events associated with user devices 110 when user devices 110 send requests for content data or other messages over the network 122. The analytics server 114 may store the location-based events and related information in the device ID database 116. The electronic system 100 may further include a home location identification (ID) system 118 in communication with a home location database 120. The home location ID system 118 may be configured to identify home locations for user devices 110 based on the location-based event information stored in the location-based event database 116. The home location ID system 118 may store home location information in the home location database 120. The analytics server 114, the location-based event database 116, the home location ID system 118, and the home location database 120 are described in further detail below.

Figure 2:
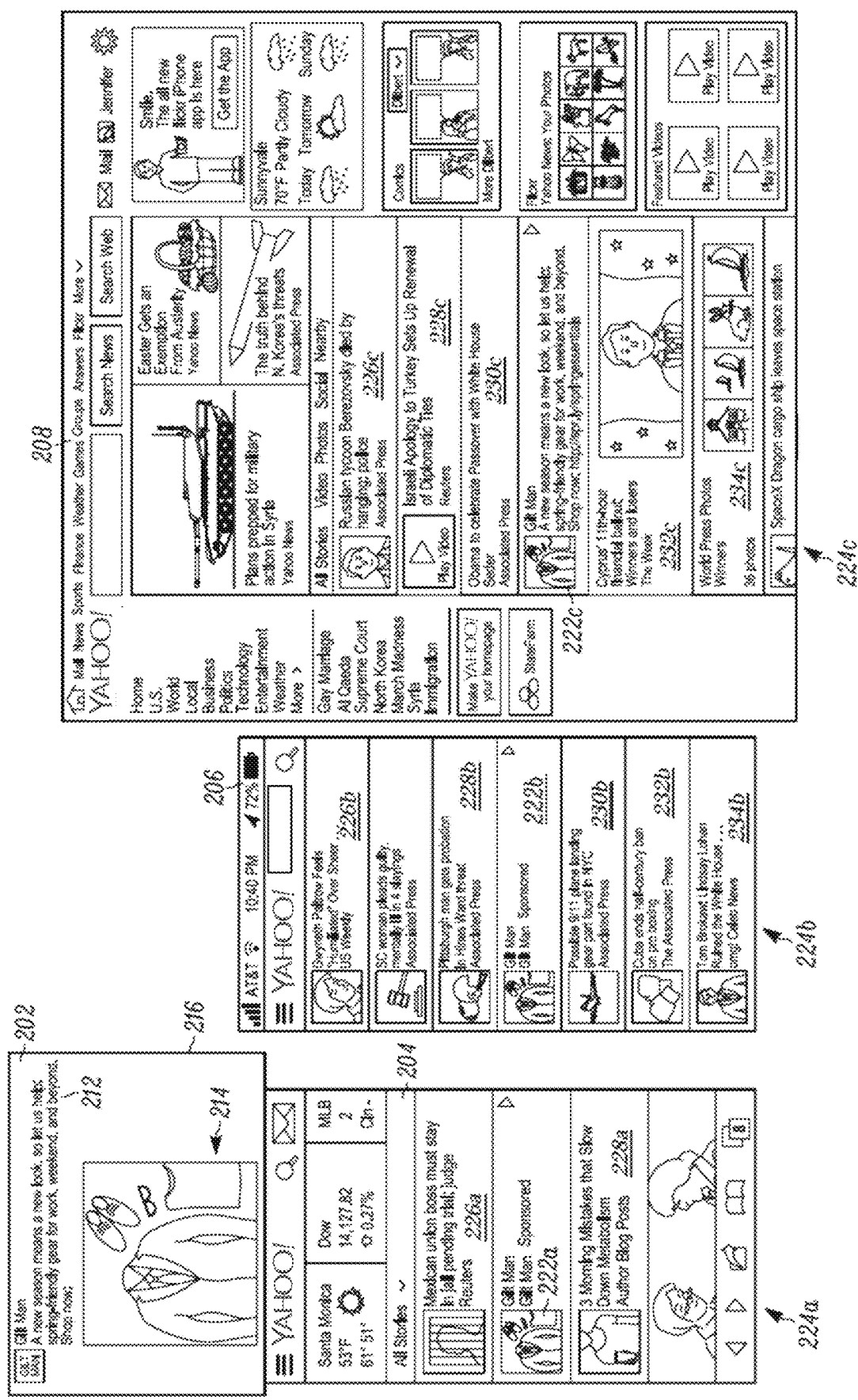
FIG. 2 illustrates displayed content items (which includes ad items) of example screens rendered by client-side applications.

FIG. 2 illustrates displayed content items (including ad items) of example screens rendered by client-side applications of the user devices 110. The content items displayed may be provided by the publisher servers 102 and the ad servers 106. In FIG. 2, a display ad 202 is illustrated as displayed on a variety of displays including a mobile web device display 204, a mobile application display 206 and a personal computer display 208. The mobile web device display 204 and the mobile application display 206 may be shown on the display screen of a mobile user device 110, such as a smartphone or a tablet. The personal computer display 208 may be displayed on the display screen of a user device 110 that is a personal computer (PC), such as a desktop computer or a laptop computer.

The display ad 202 shown in FIG. 2 may be formatted for display on a user device 110, but not as part of a stream, in order to illustrate an example of the contents of such a display ad. The display ad 202 may include text 212 and/or graphic images 214 within a defined boundary 216. The display ad 202 can be developed by an advertiser for placement on an electronic property, such as a web page or an application, and sent to a user device 110 operated by a user. The display ad 202 may be placed in a wide variety of locations on the electronic property. The defined boundary 216 and the shape of the display ad can be matched to a space available on an electronic property. If the space available has the wrong shape or size, the display ad 202 may not be useable.

In these examples, the display ad is shown as a part of streams 224*a*, 224*b*, and 224*c*. The streams 224*a*, 224*b*, and 224*c* include a sequence of items displayed, one item after another, for example, down an electronic property viewed on the mobile web device display 204, the mobile application display 206 and the personal computer display 208. The streams 224*a*, 224*b*, and 224*c* may include various types of items. In the illustrated example, the streams 224*a*, 224*b*, and 224*c* include content items and advertising items. For example, stream 224*a* includes content items 226*a* and 228*a* along with advertising item 222*a*; stream 224*b* includes content items 226*b*, 228*b*, 230*b*, 232*b*, 234*b* and advertising item 222*b*; and stream 224*c* includes content items 226*c*, 228*c*, 230*c*, 232*c* and 234*c* and advertising item 222*c*. With respect to FIG. 2, the content items can be items published by non-advertisers, e.g., the publisher servers 102 (FIG. 1). These content items may include advertising components. Each of the streams 224*a*, 224*b*, and 224*c* may include a number of content items and advertising items.

The content items positioned in any of streams 224*a*, 224*b*, and 224*c* may include news items, business-related items, sports-related items, etc. Further, in addition to textual or graphical content, the content items of a stream may include other data as well, such as audio and video data or applications. Content items may include text, graphics, other data, and a link to additional information. Clicking or otherwise selecting the link may re-direct the application (e.g., browser) on the user device 110 to an electronic property referred to as a landing page that contains the additional information. While the example streams 224*a*, 224*b*, and 224*c* are shown with a visible advertising item 222*a*, 222*b*, and 222*c*, respectively, a number of advertising items may be included in a stream of items. Also, the advertising items may be slotted within the content, such as slotted the same for all users or slotted based on personalization or grouping, such as grouping by audience members or content. Adjustments of the slotting may be according to various dimensions and algorithms. Also, slotting may be according to campaign control.

Figure 3:
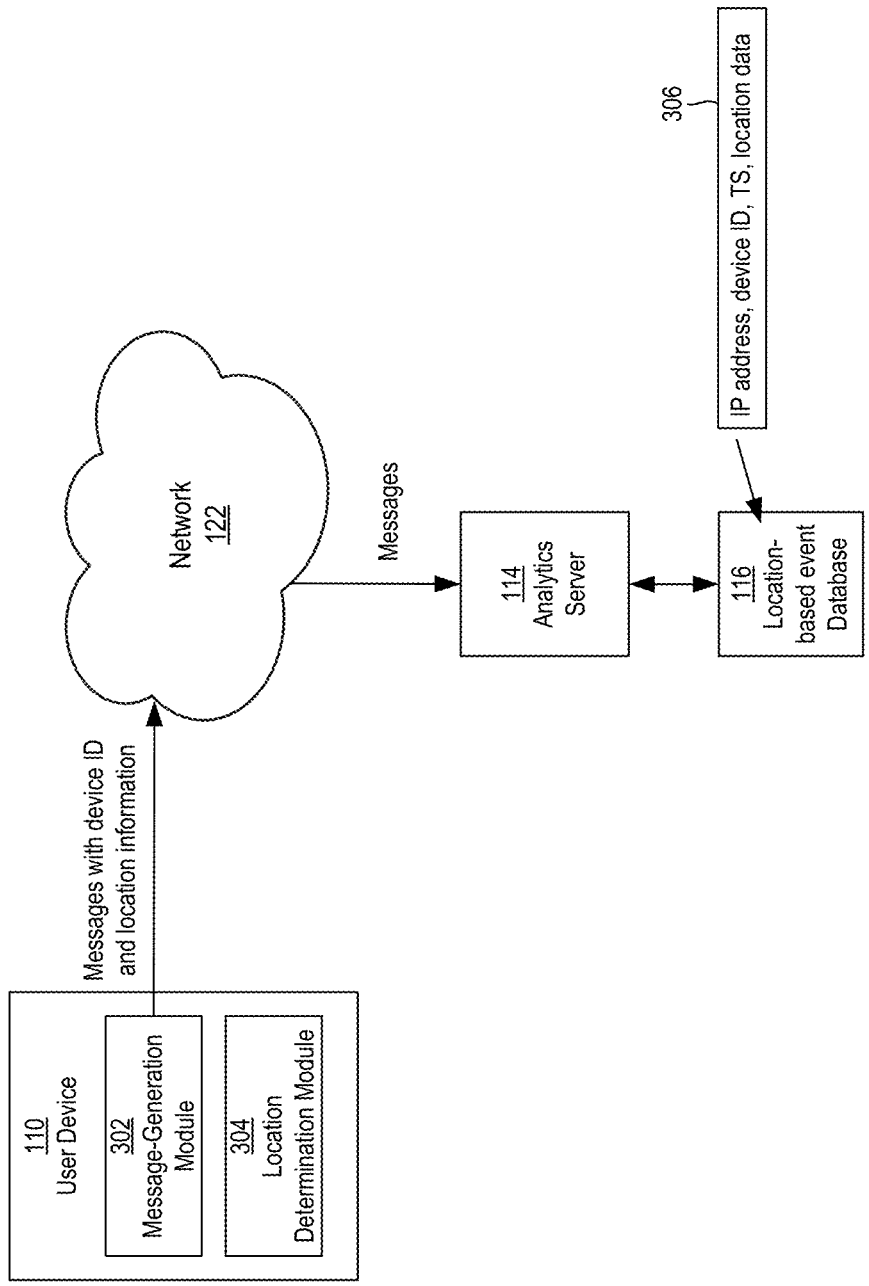
FIG. 3 is a block diagram of components of the electronic system involved in the collection of location-based events and related information.

FIG. 3 shows components of the electronic system 100 that may be involved in the collection or obtaining of location-based events and related information. In general, a user device 110 may be configured to transmit a message over the network 122. In some example situations, the message may be a request for information, non-limiting examples of which may include a webpage, email, information to be displayed in an application such as news-related information, weather-related information, or sports-related information, as non-limiting examples. In other example situations, the message may be a transmission of information in response to a request.

Each message that is sent may include a device ID that identifies the user device 110, and location information that identifies a physical location of the user device 110 at the time that the message was generated or transmitted.

As shown in FIG. 3, the user device 110 may include a message generation module 302 that is configured to generate the message, and a location determination module 304 that is configured to determine the physical location of the user device 110. In some example configurations, the location determination module 304 may be a global positioning system (GPS) module, although other possible types of systems capable of determining a physical location of the user device 110 maybe used for the location determination module 304.

As used herein, a module or sub-module may be hardware or a combination of hardware and software. For example, each module may include an application specific integrated circuit (ASIC), a field programmable gate array (FPGA), a circuit or circuitry, a digital logic circuit, an analog circuit, a combination of discrete circuits, gates, or any other type of hardware or combination thereof. In addition or alternatively, each module or sub-module may be or may be a component of a controller or control circuitry. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory or other non-transitory computer readable medium that comprises instructions executable with or by the processor to implement the features of the corresponding module without the module including any other hardware. Because each module includes at least some hardware even when the included hardware comprises software, each module may be interchangeably referred to as a hardware module.

Additionally, as used herein, the term database refers to a combination of data or a certain organized collection of data and the hardware storage that is storing the data or data collection. The hardware storage may include volatile memory, non-volatile memory, a combination thereof, or other type of non-transitory computer readable medium. Accordingly, the term database may be interchangeably referred to as a hardware database.

When the message generation module 302 generates a message, the message may include information relating to and/or indicative of the intent or purpose of the message. For example, a request to receive content may include information identifying that it is a request for content and/or what content is being requested. In addition, the message may include information relating to the characteristics of the user device 110 that generated the message and/or properties of the message. For example, the message may include a device ID and physical location information, as previously described.

The device ID may be any type of identifier that may identify the user device 110. In one example, for embodiments where the message-generation module 302 includes a web browser (e.g., Firefox, Internet Explorer, Microsoft Edge, Google Chrome, Operate, Safari, etc.) that generates or at least initiates generation of the message, the device ID may identify a type or name of the web browser being executed on the user device 110. Additionally, all or at least some of the information may be included in and/or in the form of a cookie, although other implementations may be possible. In another example, for embodiments where the message-generation module 302 includes an application (i.e., a non-web browser application) that generates or at least initiates generation of a message, the device ID may be an advertising ID formatted according to the operating system being used by the user device 110. As examples, the advertising ID may be an ID for Advertisers (IDFA) where the user device 110 is running on iOS, or may be a Google Play Store Advertising ID (GPSAID) where the user device 110 is running on Android. Various other types of device IDs may be possible.

In addition, the physical location information may include information indicative of a latitude coordinate and a longitude coordinate, although other types of physical and/or geographical location information may be possible.

Other information relating to the characteristics of the user device 110 and/or properties of the message may include a network address (e.g., an IP address) of the user device 110 and time information, such as a time stamp (TS), indicative of when the message was generated and/or sent from the user device 110 to over the network. Also, some messages may include information identifying an operating system (OS), a version of the OS, and/or a device model of the user device 110.

A message generated with the message-generation module 302 may be sent from the user device 110 and communicated over the network 122 to a destination computing device, such as to a publisher server 102 (e.g., a web server), for example. The analytics server 114, which may include one or more computing devices, may track the messages and collect the information relating to the characteristics of the user device 110 and the properties of the messages. The analytics server 114 may further be configured to store the collected information in the location-based event database 116. Each set of information associated with a particular message may be stored in the location-based event database in an entry of the database 116 as a location-based event. FIG. 3 shows an example entry 306 in the location-based event database 116 corresponding to a message originating from the user device 110. The location-based event stored in entry 306 is shown as including an IP address (or other network address), a device ID, a time stamp (TS), and location data. In this context, the term location-based event is used to refer to or indicate an event in which a user device 110 transmitted a message over the network 122, where the message included location information identifying a physical location of the user device 110. Also, in other example formats for the entry 306, some of the information, such as the IP address and/or the time stamp, may not be included. In addition or alternatively, other information, such as a user device's OS, OS version, and/or device model may be included as part of the location-based event in the entry 306.

In addition, although FIG. 3 shows only a single user device 110 sending information requests over the network 122, multiple user devices 110 (such as tens, hundreds, thousands, millions, etc. of user devices) may be in communication with the network 122 and configured to send messages over a given time period (e.g., hours, days, weeks, months, years, etc.). The analytics server 114 may track the messages from these multiple user devices 110 and collect and store the information included in these messages in the location-based event database 116.

In some example configurations, the location-based events in the location-based event database 116 may be organized into different home location event groups or collections of location-based events. Location-based events in a particular home location event group may be identified as candidates for belonging to a same home location. That is, each location-based event in a home location event group may include an associated device ID that identifies a user device 110. If the device IDs included in the home location event group identify more than one user device 110, the multiple user devices 110 that are identified are candidates for belonging to the same home location. Multiple user devices 110 may belong to the same home location if one or more users that use those user devices 110 live in the home location.

Location-based events in a particular home location event group may, in many situations, identify multiple, different device IDs. One reason this may be the case is that a single user device 110 may be configured to include different device IDs in different messages that it generates. For example, a user device 110 with both a web browser and an application may be configured to generate messages with a first-type device ID when running the web browser and a second-type device ID when running the application. Another reason may be that multiple user devices 110 may belong to the same home location. For example, a single person may use multiple user devices 110, such as a mobile phone, a tablet, a laptop computer, a desktop computer, etc. Also, multiple people (family members, roommates, etc.) living in the same home location may have or use their own personal mobile phone, table, laptop computer, desktop computer, etc.

One criterion for determining which location-based events are to be in the same home location event group is linkage to a same network address (e.g., IP address). Two user devices 110 located in the same home location when generating their respective messages may be connected to the same network (e.g., WiFi network) and, as such, include the same network address in their respective messages. Accordingly, the network addresses included in the location-based events may be useful indicators for identifying home locations. However, different location-based events with the same device ID may include different network addresses. For example, a user device 110 may send a message from its home location at one time, and then send a message at a location different from its home location at a different time—e.g., a user of the user device 110 is away from his/her home location and is accessing the Internet by connecting the user device 110 to someone else's WiFi. In some example embodiments, in order to avoid being overly narrow, a location-based event may be included in a particular home location event group associated with a particular network address if the network address included in the location-based event matches the particular network address associated with the particular home location event group, or if the device ID included in the location-based event has been included in a threshold number of other location-based events that include the particular network address, where the threshold number is one or more.

To illustrate, suppose a User Device A transmits a Message 1 from a Location A having a network address A and a User Device B transmits a Message 2 also from Location A. Accordingly a home location event group associated with network address A may include both a location-based event associated with Message 1 and a location-based event associated with Message 2 since both Message 1 and Message 2 include network address A. Then, suppose User Device A transmits a Message 3 from a Location B having a network address B and User Device B transmits a Message 4 from a Location C having a network address C. Assuming the threshold number is 1, the home location event group associated with network address A may further include both a location-based event associated with Message 3 and a location-based event associated with Message 4 since both Message 3 and Message 4 include device IDs of user devices (i.e., User Device A and User Device B) that transmitted messages including network address A (i.e, Message 1 and Message 2) at least once. The location-based events associated with Messages 1 and 2 may be considered to be directly linked to network address A and Messages 3 and 4 may be considered to be indirectly linked to network address A.

Accordingly, based on grouping together location-based events that are linked, both directly and indirectly, to a common network address, a home location event group may include a plurality of location-based events that may collectively include multiple, different device IDs and multiple, different network addresses. Also, depending on how far apart different networks associated with different network addresses are from each other and the granularity of the location information, different location-based events including different network addresses may also include different location information. Further, different location-based events with the same network address may include different location information. For example, a user device 110 connected to a particular home network may transmit different messages at different times and at different locations within the same home or boundary defining a home location, resulting in two different sets of location information. As such, location-based events of a same home location event group may collectively include different sets of location information (e.g., different sets of longitude and latitude coordinates).

Grouping the location-based events into home location event groups as described may provide, at best, several candidates of home locations for various device IDs. The home location ID system 118 (FIG. 1) may be configured to access the location-based event database 116 and, by analyzing a particular home location event group, identify a home location for at least some of the device IDs of the particular home location event group. The home location that is identified may have a higher likelihood that it is an actual home location for the associated device IDs compared to any of the individual physical locations included in the location-based events of the particular home location event group.

Figure 4:
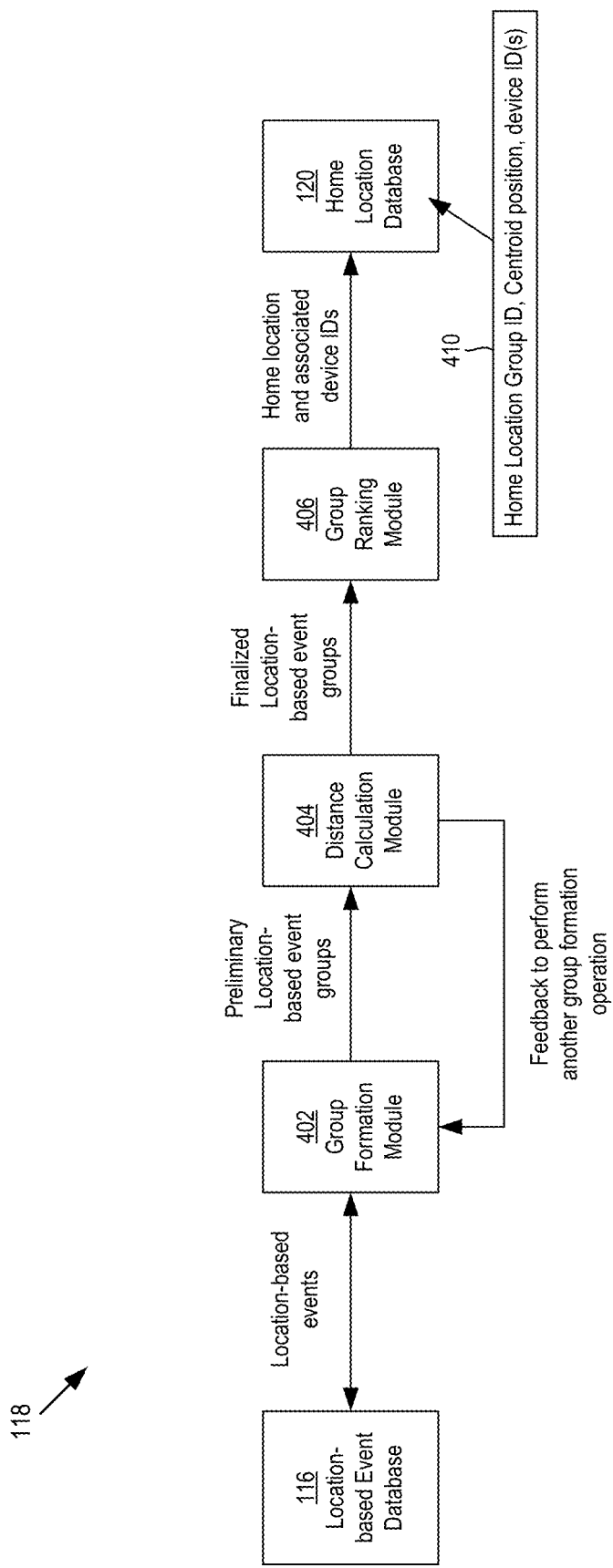
FIG. 4 is a block diagram of components of the home location ID system of FIG. 1 coupled to a location-based event database and a home location database.

FIG. 4 shows components of the home location ID system 118 that are used to identify a home location for at least some of the device IDs of a location-based event group. The components of the home location ID system 118 may include a group formation module 402, a distance calculation module 404, and a group ranking module 406.

The group formation module 402 may be configured to access the location-based event database 116 to obtain location-based events and group the location-based events into a number of location-based event groups, with each group including one of the location-based events retrieved from the location-based event database 116. In a particular configuration, the location-based events that the group formation module 402 forms into location-based event groups may be of a same home location event group. In this sense, the location-based event groups that the group formation module 402 forms may be considered sub-groups of the home location event group to which they belong.

In one example configuration, the group formation module 402 may be configured to perform k-means clustering in order to form the groups. Where k-means clustering is performed, the groups that are formed may be referred to as clusters, and the location-based events may be referred to as cluster elements of the clusters to which they belong. Accordingly, the terms location-based event and cluster element may be used interchangeably in the context of k-means clustering.

Figure 5:
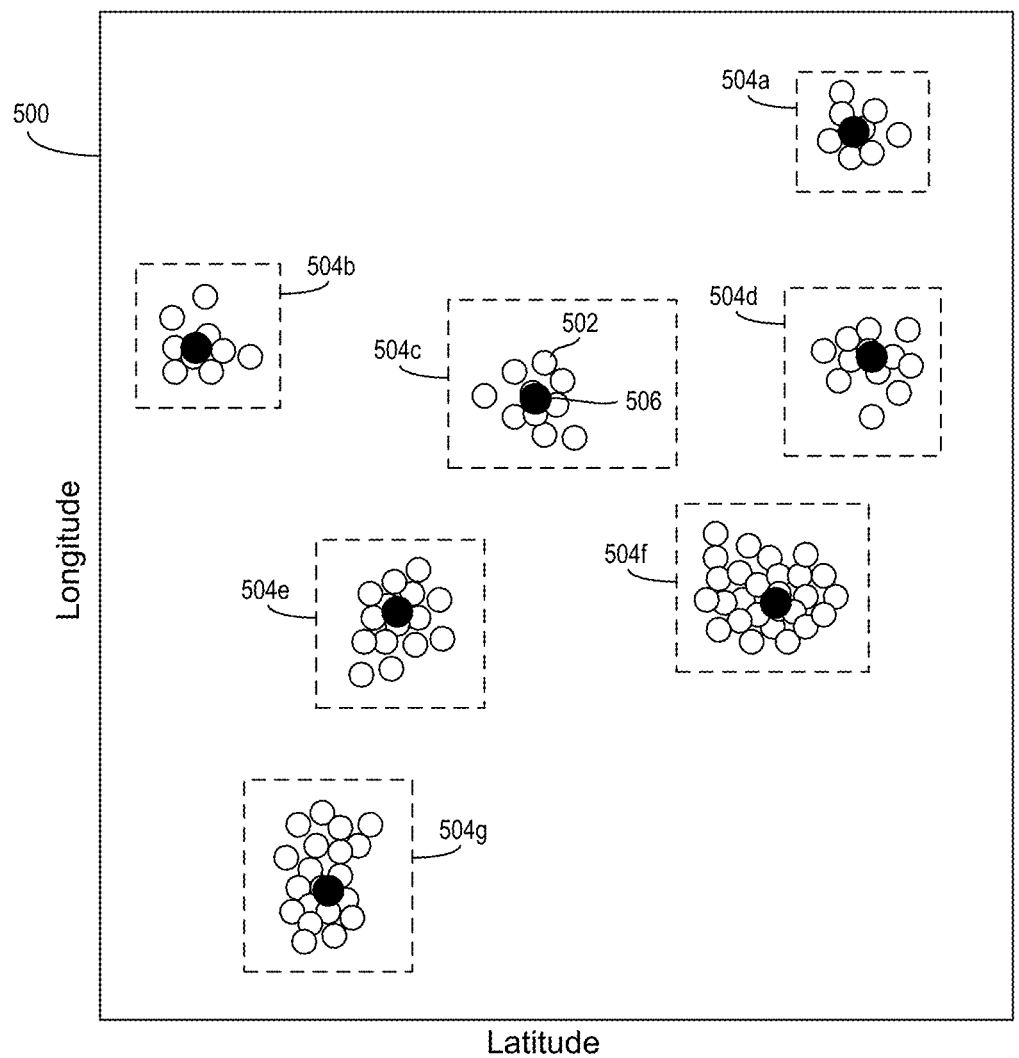
FIG. 5 is a schematic diagram of an example set of location-based events mapped to a map projection.

FIG. 5 is a schematic diagram of an example set of location-based events 502 mapped to a map projection 500. As shown in FIG. 5, latitude coordinates are provided on the x-axis and longitude coordinates are provided on the y-axis of the map projection 500. The small circles 502 represent individual location-based events or cluster elements of the set on which a k-means cluster operation is performed. Each location-based event 502 is positioned in the map projection 500 according to its location information, such as its latitude and longitude data included in and/or indicated by the location information. Additionally, dotted boxes 504 groups or clusters in which each of the location-based events 502 are included. The particular example shown in FIG. 5 includes seven groups or clusters 504a-504g. Also, black dots 506 in the map projection 500 represent centroids of the clusters 504. That is, each cluster 504 may have an associated centroid 506. A centroid of a given cluster 504 is the mean position of all of the cluster elements 602 of the given cluster 504. FIG. 5 shows the location-based events 502 finally grouped into their respective seven clusters 504a-504g and the centroids 506 in their respective centroid positions for each of the clusters 504a-504g following the end of a k-means clustering operation.

Figure 6:
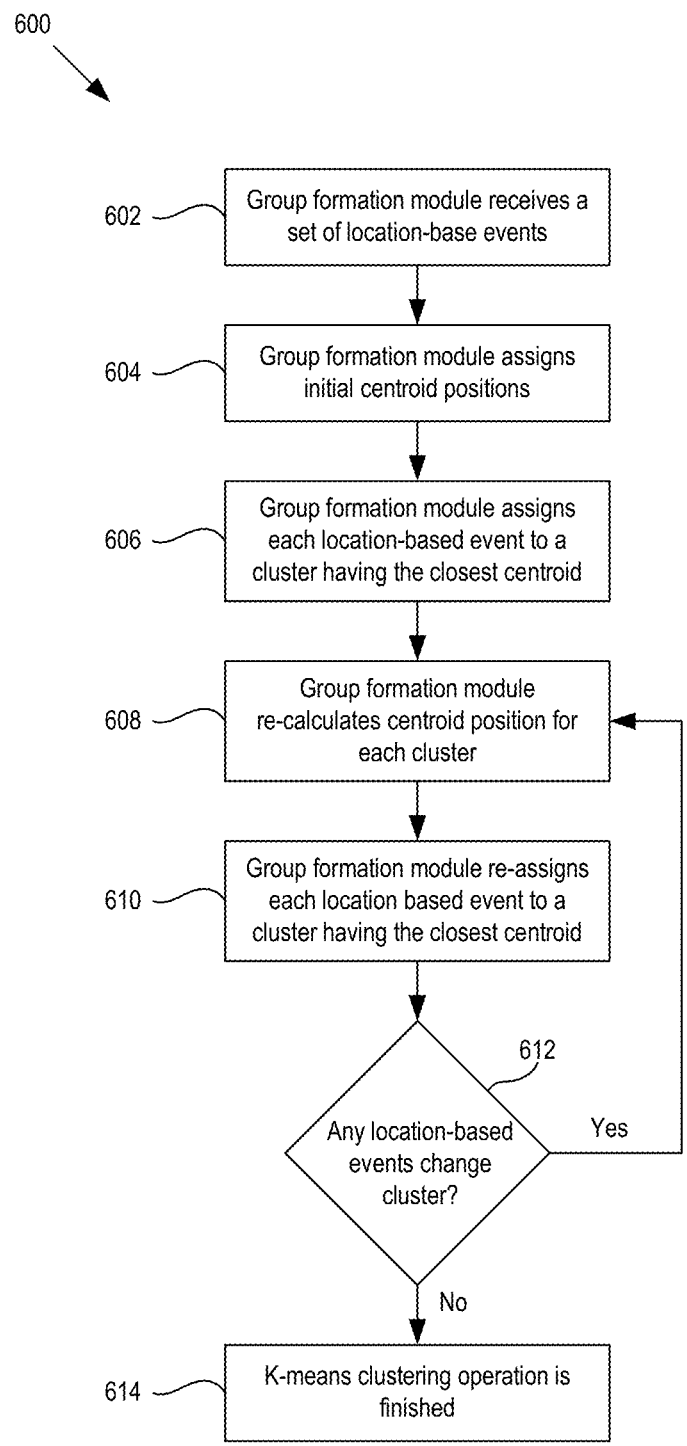
FIG. 6 is a flow chart of a method of performing a k-means clustering operation.

FIG. 6 is a flow chart showing actions of a k-means clustering operation 600 performed with the group formation module 402 in order to form an N-number of clusters. The k-means clustering operation 600 of FIG. 6 is described with reference to the location-based events 502 mapped to the map projection 500 in FIG. 5. At block 602, the group formation module 402 may receive a set of location-based events 502 from the location-based event database 116. As previously described, for some example configurations, the location-based events 502 in the set may be part of a same home location event group. At block 604, the group formation module 402 may assign initial centroid positions for centroids 506 for each of the N-number of clusters 504 to be formed. As described in further detail below, the group formation module 402 may be configured to perform one or more k-means clustering operations in order to form a final set of clusters. Where multiple k-means clustering operations are performed, each k-means clustering operation may form a different number of clusters. When the k-means clustering operation is an initial operation, the group formation module 402 may be configured to determine an initial number of clusters to form. The group formation module 402 may be pre-configured with an initial number, or alternatively, the initial number may be an input to the group formation module 402. For subsequent k-means clustering operations, the group formation module 402 may receive feedback from the distance calculation module 404 indicating how many clusters to form. Additionally, during an initial iteration of a k-means operation, the group formation module 402 may determine the initial centroid positions in various ways. In some example configurations, the initial centroid positions may be chosen randomly.

At block 606, the group formation module 402 may assign each location-based event 502 to one of the clusters 504. Which cluster 504 a given location-based event 502 is assigned may be based on which centroid 506 is closest to that given location-based event 502. In some example configurations, the group formation module 402 may use a Euclidean distance formula to determine which of the centroids 506 is closest to the given location-based event 502, although other ways to determine which centroid 506 is closest may be possible. After each location-based event 502 is assigned to one of the clusters 504, then at block 608, the group formation module 402 may recalculate a centroid position for each of the centroids 506. As previously described, a centroid 506 is a mean position of the cluster elements of a given cluster. Accordingly, at block 608, for each of the clusters 504, the group formation module 402 may recalculate a centroid position of a centroid 506 of a given cluster 504 by determining the mean position of the location-based events 502 that were assigned to that given cluster 504 at block 606.

After the centroid positions of the centroids 506 are recalculated at block 608, then the group formation module 402 may re-assign each of the location-based events 502 to one of the centroids 506 at block 610. Similar to the assigning performed at block 604, the group formation module 402 may assign a given location-based event 502 to the closest centroid 506. Since a centroid position of one or more centroids 506 may have changed due to the recalculation of centroid positions at block 608, then one or more location-based events 502 may become closer to a different centroid 506, and as a result, be assigned to a different cluster 504 at block 610.

At block 612, the group formation module 402 may determine if any of the location-based events 502 changed clusters 504 due to the cluster reassignment performed at block 610. If so, then the k-means cluster operation 600 may proceed back to block 608, and the group formation module 402 may recalculate centroid positions for one or more of the centroids 506 due to the changing of one or more location-based events 502 into a different cluster 504. The k-means clustering operation 600 may proceed in this manner, repeating blocks 608, 610, and 612 until none of the location-based events 602 are reassigned to a different cluster 504 at block 610. That is, at block 612, if none of the location-based events 502 is assigned to a different cluster 504, then the k-means clustering operation 600 may proceed to block 614, where the operation 600 is finished.

The k-means clustering operation described with reference to FIGS. 5 and 6 is one example method of forming a set of location-based events into a plurality of groups. Ways to group location-based events into a plurality of groups other than through use of k-means clustering may be possible.

Referring back to FIG. 4, when the group formation module 402 is finished performing a group formation operation, it may provide information identifying the location-based event groups to the distance calculation module 404. The location-based event group information may indicate which group each location-based event is included. The group formation module 402 may be configured to perform several group formation operations for a given set of location-based events. Each subsequent group formation operation may be performed to generate a different number of groups than was previously generated. When the group formation module 402 performs one group formation operation, whether it performs another group formation operation may depend on the distance calculation module 404 and feedback information that the distance calculation module 404 sends back to the group formation module 402 (or lack of feedback). In that regard, the location-based event group information that the group formation module 402 sends to the distance calculation module 404 may be referred to as preliminary location-based event group information, as shown in FIG. 4.

The distance calculation module 404 may be configured to determine whether the preliminary location-based event group information received from the group formation module 402 satisfies a distance criterion. If the distance calculation module 404 determines that the distance criterion is not satisfied, then the distance calculation module 404 may instruct the group formation module 402 to perform another group formation operation to regroup the set of location-based events into a different number of groups. Alternatively, if the distance calculation module 404 determines that the distance criterion is satisfied, then the distance calculation module 404 may determine that no further group formation operations are to be performed, and in turn provide the information identifying the location-based event groups it received from the group formation module 402 to the group ranking module 406, as described in further detail below.

The distance criterion may be that an average distance of the location-based events away from target points or locations of respective groups satisfied a distance threshold or threshold range. Where k-means clustering is performed to form the groups, the target location of a given group may be a centroid position of the given group's centroid. The distance threshold or distance threshold range may correspond to a desired perimeter or boundary defining a home location and/or the premises of a home location. An average distance that is greater than the distance threshold or threshold range may indicate that under-grouping was performed. That is, a group formed could include location-based events associated with different home locations, and hence an increased number of groups should be formed. Conversely, an average distance that is less than the distance threshold or threshold range may indicate that over-grouping was performed. That is, two or more groups formed may cover a single home location, and hence the number of groups formed should be reduced.

Accordingly, upon receipt of the preliminary-based event group information, the distance calculation module 404 may analyze each cluster, and for each cluster, determine an average distance that the location-based events are from their associated target location (e.g., centroid position). In some example configurations, if the distance calculation module 404 determines that an average distance value that is calculated is within a distance threshold range, then the distance calculation module 404 may determine that the distance criterion is satisfied—i.e., that an optimal number of groups has been formed—and no further group formation operations for that set of location-based events are to be performed.

Alternatively, if the distance calculation module 404 determines that the average distance value is above an upper bound of the distance threshold range, then the distance calculation module 404 may determine that another group formation operation is to be performed with an increased number of groups. The number of groups to form and/or by how much to increase may correspond to how far above the average distance value is above the upper bound. Alternatively, the distance calculation module 404 may be configured to have the number of groups incremented by a predetermined number (e.g., one) irrespective of the average distance value relative to the upper bound.

Still alternatively, if the distance calculation module 404 determines that the average distance value is below a lower bound of the distance threshold range, then the distance calculation module 404 may determine that another group formation operation is to be performed with a decreased number of groups. The number of groups to form and/or by how much to increase may correspond to how far below the average distance value is below the lower bound. Alternatively, the distance calculation module 404 may be configured to have the number of groups decremented by a predetermined number (e.g., one) irrespective of the average distance value relative to the lower bound.

In another example configuration, the group formation module 402 may be configured to perform an initial group formation operation by forming a relatively low number of groups. The distance calculation module 404 may then continuously instruct the group formation module 402 to perform another group formation operation with an increased (e.g., incremented) number of groups until the distance calculation module 404 determines that an average distance value has fallen below a distance threshold. Once the average distance value has fallen below the distance threshold, then the distance calculation module 404 may determine that the previous number of groups formed is the optimal number of groups to be formed for that set of location-based events.

In still another example configuration, the group formation module 402 may be configured to perform an initial group formation operation by forming a relatively high number of groups. The distance calculation module 404 may then continuously instruct the group formation module 402 to perform another group formation operation with a decreased (e.g., decremented) number of groups until the distance calculation module 404 determines that an average distance value has risen above a distance threshold. Once the average distance value has risen above the distance threshold, then the distance calculation module 404 may determine that the previous number of groups formed is the optimal number of groups to be formed for that set of location-based events.

Various other ways to determine whether to perform another group formation operation with an increase number of groups or a decreased number of groups based on an average distance value relative to a threshold distance or threshold distance range may be possible.

Additionally, the average distance value that is used to determine whether the distance criterion is satisfied may be calculated in various ways. In one example configuration, the distance calculation module 404 may calculate an average distance value for each of the groups. The distance calculation module 404 may then compare each of the average distance values to the distance threshold or threshold range. If at least one of the average distance values or a threshold number of average distance values does not satisfy the distance criterion, then the distance calculation module 404 may determine to have another group formation operation performed. Alternatively, the distance calculation module 404 may calculate an average of the average distance values and compare that second average value to the distance threshold or distance threshold range. In other example configuration, the distance calculation module 404 may calculate a distance from a location-based event to an associated target location (e.g., centroid position) for all of the location-based events of the set. The distance calculation module 404 may then calculate an average distance value based on the calculated differences. Various other ways of generating an average distance value based on distances of the location-based events from associated target locations may be possible.

In addition, if the distance calculation module 404 determines that another group formation operation is to be performed, then the distance calculation module 404 may send feedback information to the group formation module 402. The feedback information may indicate to the group formation module 402 that it is to perform another group formation operation for the set of location-based events and how many groups the group formation module 402 is to form for the next group formation operation. Alternatively, if the distance calculation module 404 determines that an optimal number of groups has been formed for the set of location-based events (e.g., the distance criterion is satisfied), then the distance calculation module 404 may be configured to set or designate the preliminary location-based event group information with the optimal number of groups as the final location-based event group information for that set and send the final location-based event group information to the group ranking module.

The group ranking module 406 may be configured to determine which of the groups identified in the final location-based event group information is most likely to identify a home location of one or more device IDs identified in the final location-based event group information. The group ranking module 406 may be configured to make the determination based on one or more criteria. One example criterion may be which of the groups has the most distinct device IDs. Accordingly, the group ranking module 406 may be configured to analyze each of the groups and the device IDs included in the location-based events to determine which group has the most distinct device IDs. The group that has the most distinct IDs may be identified by the group ranking module 406 as being the group most likely to identify a home location of the device IDs included in that group. Another example criterion may be which of the groups has the most location-based events (e.g., cluster elements). Accordingly, the group ranking module 406 may be configured to analyze each of the groups to determine which group has the most location-based events. The group that with the highest number of location-based events may be identified by the group ranking module 406 as being the group most likely to identify a home location of the device IDs included in that group. In some example configurations, the group ranking module 406 may be configured to determine which of the groups to designate as the home location group based on a combination of the number of distinct IDs and the number of location-based events. In a particular example configuration, the number of distinct IDs may be a primary criterion and the number of location-based events may be a secondary criterion. That is, if there is only one group that has the most distinct IDs, that group may be designated as the home location group with considering the number of location-based events. However, if two or more groups are tied for having the most distinct IDs, then the group ranking module 406 may look to the number of location-based events as the tie breaker and select the group having both the most distinct IDs and the largest number of location-based events as being the home location group.

Another example criterion may be related to a time occurrence or time stamp of the location-based events, such as which group has the most location-based events that have a time stamp falling within a predetermined time period. A particular predetermined time period may be from an early evening time of one day to a morning time of a next day—the notion being that people, on average, may be more likely to be at home in the evening, through the night, and into the following morning than they are in the late morning and afternoon time periods. In one particular configuration, the home ranking module 406 may be configured to designate as the home location group the group with the most location-based events occurring during the predetermined time period. In a particular configuration, the group ranking module may use the time stamp criterion as a secondary or a tertiary criterion. For example, if the group ranking module 406 is unable to determine a home location group based on which group has the highest number of distinct device IDs and/or which group has the highest number of location-based events, the home ranking module 406 may analyze the time stamps of the location-based events to select a home location group.

Upon determining which group to designate as the home location group, the group ranking module 406 may be configured to store, in the home location database 120, home location information that associates the group identified as the home location group with the device IDs included in location-based events that are part of that group. In some example configurations, the group ranking module 406 may be configured to assign an index or other home location group ID to the home location group. In addition or alternatively, the group ranking module 406 may use the centroid position, which may include latitude and longitude coordinates, of the home location group to identify the home location group and associate the home location group with one or more device IDs. FIG. 4 shows the home location information of an entry 410 of the home location database 120 as including a home location ID to uniquely identify a home location group, an associated centroid position of the home location group, and device IDs associated with the home location group. Other formats of an entry 410 in the home location database 120 may be possible.

Figure 7:
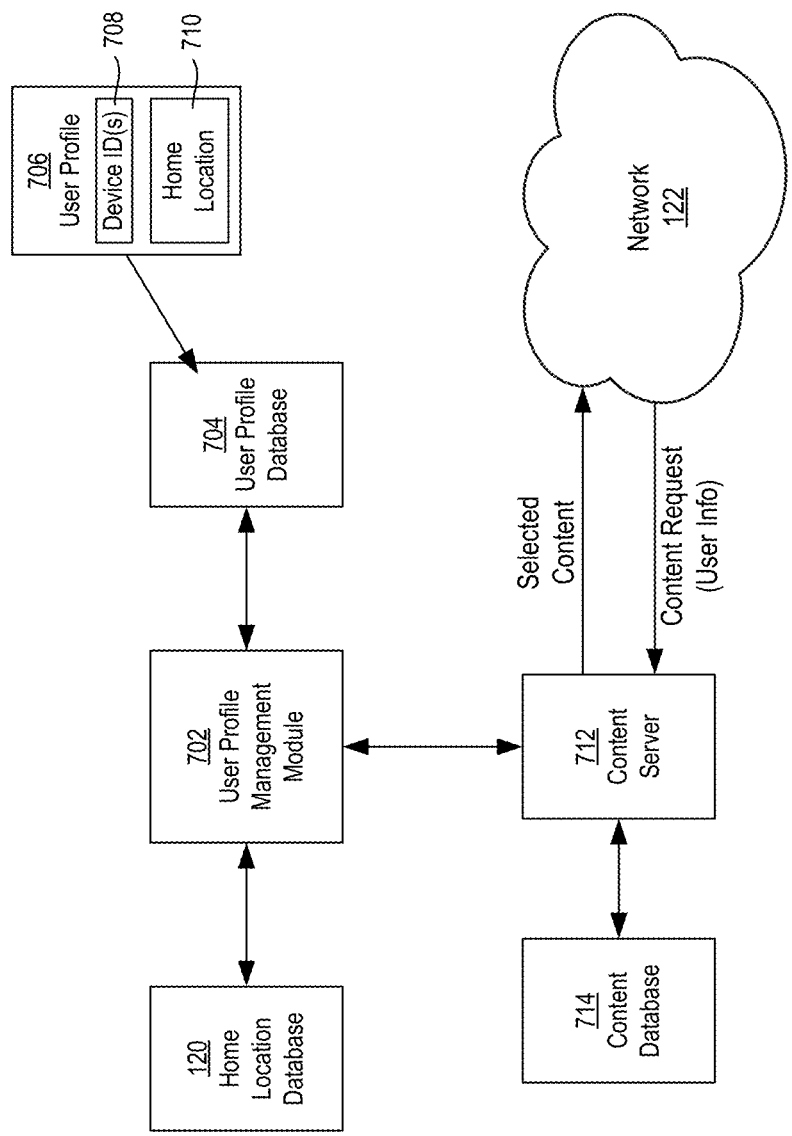
FIG. 7 is a block diagram of components of an electronic system that may use home location information for targeted or personalized network-based content serving.

FIG. 7 shows components of an electronic system, such as of the electronic system 100, that may use the home location information in the home location database 120 for targeted or personalized network-based content serving, such as targeted or personalized advertising. One of the components in FIG. 7 may be a user profile management module 702, which may be a component of the analytics server 114 or an ad server 106 of FIG. 1, or another server or computing device of the electronic system 100. In general, the user profile management module 702 may collect information about users of the user devices 110, such as age, gender, demographics, interests, Internet browsing history, and download history, as non-limiting examples. In addition, the user profile management module 702 may be configured to build user profiles for identified users that include the collected user information. Additionally, the user profile management module 702 may be configured to manage, maintain, and/or update the user profiles. The user profile management module 702 may be configured to store the user profiles in a user profile database 704.

The user profile management module 702 may be configured to access the home location database 120 and include home location information (e.g., physical location, latitude and longitude coordinates, etc.) indicates in the entries of the home location database 120 into user profiles. FIG. 7 shows a user profile 706 stored in the user profile database 704 as including one or more device IDs 708 and home location information 710. When a new entry is populated in the home location database 120, the user profile management module 702 may access the home location database 120 and analyze information included in the new entry, and in particular the device ID(s) and the home location identified in the new entry. The user profile management module 702 may then check the user profile database to see if user profiles exist for any of the device IDs included in the new entry. If so, then the user profile management module 702 may be configured to include the home location information included in the new entry in the existing user profiles. If by chance similar home location information is already included, the user profile management module 702 may consider the home location information included in the new entry as being more correct or accurate, and replace the home location information already included in the user profile with the home location information already included in the new entry. Alternatively, for user IDs included in the new entry for which a corresponding user profile does not already exist, the user profile management module 702 may create a new user profile that includes the device ID and the home location information.

In some example configurations, the user profile management module 702, or other computing device with access to the user profiles stored in the user profile database, may perform further processing on the home location information in the user profile. Further processing may include identifying or deriving one or more characteristics associated with the home location, which may then be used to infer a characteristic or interest of a user, which in turn, may be added to the user profile. For example, from the home location, the further processing may derive a geographic region or area, even as specific as a particular address, a neighborhood, or a sub-division of the home location. In addition or alternatively, the further processing may derive a property value of the home location. Other types of information about the home location may be derived. Using this information, additional information may be inferred about the users that live there, such as levels of income, demographics, hobbies, etc. This, in turn, may be used to make certain decisions or selections regarding personalized or targeted network-based content serving.

As shown in FIG. 7, the user profile management module 702 may be in communication with a content server 712 that is configured to send selected content over the network 122 for display on user devices 110. An example content server 712 may be a publisher server 102 or an ad server 106. The content server 712 may receive a content request for content or a content item to be displayed on a user device 110. (If the request is for an advertisement, then the content request may be considered an ad request). The content request may include user information associated with the user device 110 on which the content is to be displayed. In some example situations, the user information may include a device ID. In response to receipt of the content request, the content server 712 may communicate with the user profile management module 702 to identify a user profile in order to identify information about the user. Doing so may assist the content server 712 in selecting particular content or a content item of a plurality of content items from a content database 714 that may be of interest to the user. An example content database may be a publisher database 104 or an ad database 108. In general, content may be any advertisement or non-advertisement content to be displayed on a user device 110 in response to a request received by the content server 712 from over the network 122. The content database 714 may store various content, and the content server 712 may be configured to access the content database 714 to select particular content pursuant to the request.

Knowing a particular home location or at least a high-statistical inference of a home location, such as a particular geographical coordinate and/or a home address may provide additional information that the content server 712 can use to select content, which in turn, may improve the quality of the user profiles in the user profile database 704 and/or the ability of the content server 712 to select optimal content for sending to user device 110. Conversely, without deriving such home location information using the location-based event information included in the location-based event database 116 as described with reference to FIGS. 4-6, such home location information may not otherwise be included in user profiles since such information, due to laws and regulations, may not be available to the user profile management module 702 and/or to the content server 712 for personalized network-based content serving.

Figure 8:
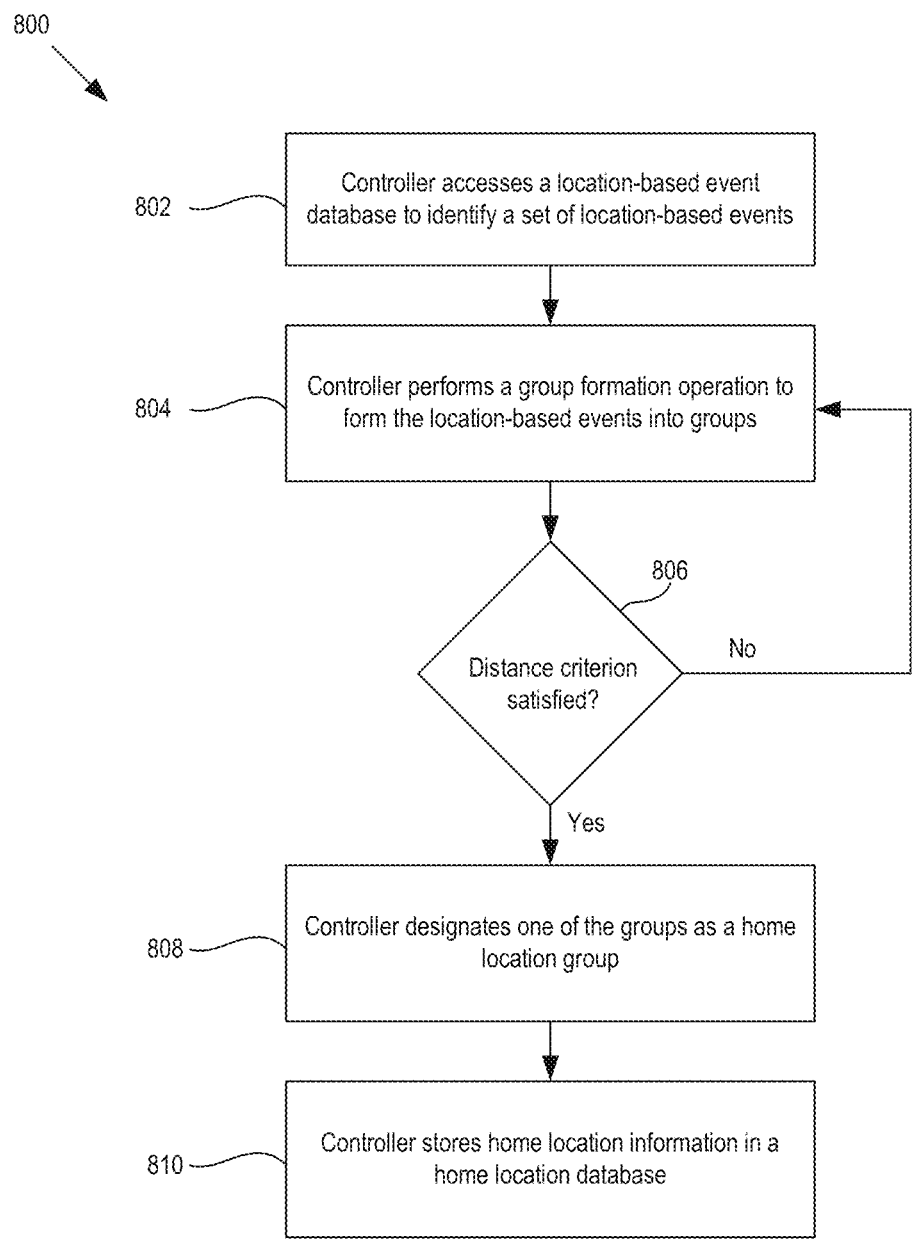
FIG. 8 is a flow chart of an example method of identifying a home location for one or more user devices.

FIG. 8 is a flow chart of an example method 800 of identifying a home location for one or more device IDs of user devices. At block 802, a controller of a computing device (e.g., a controller of one or more computing device of the electronic system 100 and/or implementing the modules of FIG. 4) may be configured to access a location-based event database (e.g., the location-based event database 116 of FIG. 1) to obtain a set location-based events that are to be grouped into groups or clusters for identification of the home location. Each location-based event in the set may include information associated with the location-based event, including a device ID of a user device that transmitted a message associated with the location-based event, a time stamp, and location information identifying a geographic location of the user device when the message was generated.

At block 804, the controller may perform a group formation operation to form the location-based events into a plurality of groups of location-based events. Which location-based events are in which groups may depend on the location information included in each location-based event and how many groups the controller is to form during the group formation operation. In some example methods, the controller may perform k-means clustering in order to form the groups, as previously described. At block 806, the controller may determine whether the groups that are formed at block 804 satisfy a distance criterion. In some example methods, the controller may make the determination by comparing an average distance value with a distance threshold or distance threshold range, as previously described. If the controller determines that the distance criterion is not satisfied, then the method may proceed back to block 804, and the controller may perform another group formation operation, with the number of groups being formed in the subsequent group formation operation being different than the number of groups formed in the last group formation operation. When the number is increased or decreased from the number formed in the last group formation operation may depend on the average distance value relative to the distance threshold or distance threshold range.

Alternatively, if the controller determines that the distance criterion is satisfied, then at block 808, the controller may designate one of the groups as a home location group, which may indicate the group, among the plurality of groups, that is most likely to be a home location of users of user devices having the device IDs included in that group. The controller may determine which group is to be designated the home location group based on one or more criteria, such as which group has the most distinct device IDs, which group has the largest number of location-based events, which group has the most location-based events occurring within a predetermined time period, or some combination thereof, as previously described. At block 810, upon designating one of the groups as the home location group, the controller may store, in a home location database, information associating the home location group with the device ID(s) included in the group. In some example methods, the storing performed at block 810 may include storing physical location information of the home location group, which may be a centroid position or geographical location of a centroid of the home location group.

Figure 9:
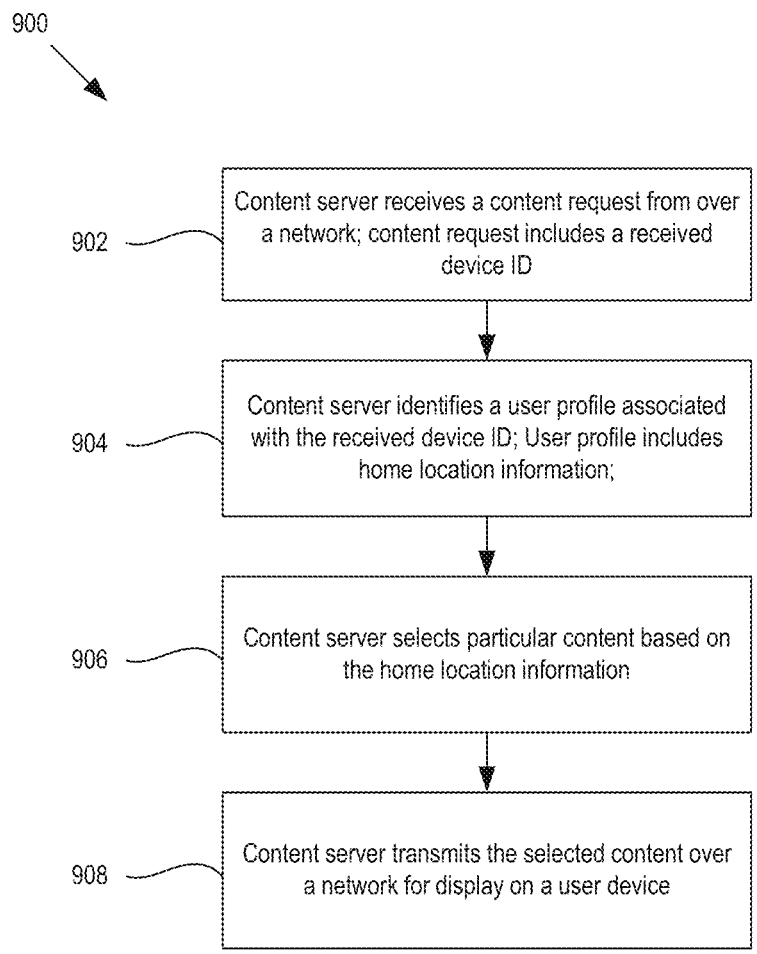
FIG. 9 is a flow chart of an example method of transmitting selected or personalized content for display on a user device.

FIG. 9 is a flow chart of an example method 900 of transmitting selected or personalized content for display on a user device, such as one of the user device 110 of FIG. 1. The method 900 may be performed with a content server, such as the content server 712 of FIG. 7. At block 902, the content server may receive a content request from over a network. The content request may be a request for the content server to select particular content from a content database (e.g., the content database 714 of FIG. 7). In addition, the content request may include a received device ID.

At block 904, the controller may identify a user profile associated with the received device ID, and identify user information included in the user profile to assist the controller is selecting particular content. The user information may include a home location, which may be included in the user profile based on forming location-based events into a plurality of groups and designating one of the groups as a home location group, as previously described. At block 906, the content server may select particular content from the content database based on the home location information identified at block 904. At block 908, the content server may transmit the selected content over the network for display on the user device. In some examples, the method may include the receipt and display of the selected content on a display screen of the user device.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the preferred embodiments described herein can be used alone or in combination with one another.

The invention claimed is:

1. An electronic system comprising:
a memory comprising a home location database; and
one or more processors configured to:
receive one or more messages from one or more user devices, wherein each message of the one or more messages comprises an indication of at least one of a physical location of a user device or a network address of the user device;
collect, from the one or more messages, information relating to characteristics of the one or more user devices comprising at least one of location information or network address information;
store the information relating to characteristics of the one or more user devices in an event database;
access the event database, wherein the event database comprises a plurality of events identifying a set of user devices and physical locations of the user devices in the set, wherein each event of the plurality of events identifies a respective physical location of at least one of the user devices;
in response to the accessing, group each event of the plurality of events into at least one of a plurality of groups based on the physical locations identified in the plurality of events;
designate at least one of the plurality of groups as a home location group that identifies a home location of at least one user of the user devices in the set, the designation based on at least one criterion associated with the plurality of groups;
determine that a first location-based event and a second location-based event are associated with a same device ID and that the first location-based event comprises a first network address and the second location-based event comprises a second network address different than the first network address;
in response to determining that the first network address in the first location-based event matches a home network address associated with the home location group, include the first location-based event in the home location group;
in response to the designation, store, in the home location database, home location information that associates the home location with user devices, in the set, that are included in the home location group;
receive a content request identifying user information associated with a first user device of the user devices included in the home location group;
in response to receipt of the content request, identify the home location of the first user device based on the home location information stored in the home location database;
select a content item from a plurality of content items based on the identification of the home location; and
send the content item over a network to the first user device.

2. The electronic system of claim 1, wherein the one or more processors are configured to:
determine that a third location-based event and a fourth location-based event are associated with a second same device ID and that the third location-based event comprises a third network address and the fourth location-based event comprises a fourth network address different than the third network address.

3. The electronic system of claim 2, wherein the one or more processors are configured to:
in response to determining that the second same device ID has been included in a threshold number of other location-based events comprising the home network address associated with the home location group, include the third location-based event and the fourth location-based event in the home location group.

4. The electronic system of claim 1, wherein the at least one criterion comprises a primary criterion and a secondary criterion, the primary criterion comprising which of the plurality of groups has a largest number of unique device identifications and the secondary criterion comprising which of the plurality of groups has a largest number of events of the plurality of events.

5. The electronic system of claim 1, wherein the at least one criterion comprises which of the plurality of groups has a largest number of events occurring within a predetermined time period covering when a person is most likely to be at the home location.

6. The electronic system of claim 1, wherein the one or more processors is configured to perform k-means clustering on the plurality of events to group each event of the plurality of events into at least one of the plurality of groups.

7. The electronic system of claim 1, wherein the one or more processors are configured to:
determine whether the plurality of groups satisfies a distance criterion;

in response to a determination that the plurality of groups satisfies the distance criterion, designate the plurality of groups as being a final grouping for the plurality of events; and in response to a determination that the plurality of groups does not satisfy the distance criterion, regroup the plurality of events into a new plurality of groups, wherein the new plurality of groups is of a different number than the plurality of groups.

8. The electronic system of claim 7, wherein the one or more processors are configured to:
calculate an average distance value for the plurality of groups;
compare the average distance value to a distance threshold or a distance threshold range; and
determine whether the plurality of groups satisfies the distance criterion based on the comparison.

9. The electronic system of claim 1, wherein the one or more processors are configured to:
determine whether a user profile database comprises one or more user profiles associated with one or more user devices of the user devices of the set.

10. The electronic system of claim 9, wherein the one or more processors are configured to:
responsive to determining that the user profile database does not comprise one or more user profiles associated with one or more devices of the user devices of the set, create a first user profile, associated with at least one user device of the user devices of the set, based on the home location information.

11. The electronic system of claim 9, wherein the one or more processors are configured to:
responsive to determining that the user profile database does comprise one or more user profiles associated with one or more devices of the user devices of the set, update a first user profile, associated with at least one user device of the user devices of the set, based on the home location information.

12. A method comprising:
receiving one or more messages from one or more user devices, wherein each message of the one or more messages comprises an indication of at least one of a physical location of a user device or a network address of the user device;
collecting, from the one or more messages, information relating to characteristics of the one or more user devices comprising at least one of location information or network address information;
storing the information relating to characteristics of the one or more user devices in an event database, wherein the event database comprises location-based events identifying a set of user devices and physical locations of the user devices in the set;
grouping the location-based events into a plurality of groups according to the physical locations identified in the location-based events and a number of groups to be formed;
identifying at least one of the plurality of groups as a home location group that identifies a home location for at least one user of the user devices in the set, the identifying of the home location group based on at least one criterion associated with the plurality of groups;
determining that a first location-based event and a second location-based event are associated with a same device ID and that the first location-based event comprises a first network address and the second location-based event comprises a second network address different than the first network address;
in response to determining that the same device ID has been included in a threshold number of other location-based events comprising a home network address associated with the home location group, including the first location-based event and the second location-based event in the home location group;
storing, in a home location database, home location information that associates the home location with user devices in the set that are included in the home location group;
receiving a content request identifying user information associated with a first user device of the user devices included in the home location group;
in response to receipt of the content request, identifying the home location of the first user device based on the home location information stored in the home location database;
selecting a content item from a plurality of content items based on the identification of the home location; and
sending the content item over a network to the first user device.

13. The method of claim 12, wherein the at least one criterion comprises at least one of:
which of the plurality of groups has a largest number of unique device identifications;
which of the plurality of groups has a largest number of location-based events of the location-based events; or
which of the plurality of groups has a largest number of events occurring within a predetermined time period covering when a person is most likely to be at the home location.

14. The method of claim 12, wherein grouping the location-based events into a plurality of groups comprises performing k-means clustering.

15. The method of claim 12, comprising:
determining whether the plurality of groups satisfies a distance criterion;
in response to determining that the plurality of groups satisfies the distance criterion, designating the plurality of groups as being a final grouping for the location-based events; and
in response to determining that the plurality of groups does not satisfy the distance criterion, regrouping the location-based events into a new plurality of groups, wherein the new plurality of groups is of a different number than the plurality of groups.

16. The method of claim 15, comprising:
calculating an average distance value for the plurality of groups; and
comparing the average distance value to a distance threshold or a distance threshold range.

17. The method of claim 16, comprising:
determining whether the plurality of groups satisfies the distance criterion based on the comparing.

18. One or more non-transitory computer readable storage media storing instructions that, when executed by a computer processor, cause the computer processor to perform operations comprising:
receiving one or more messages from one or more user devices, wherein each message of the one or more messages comprises an indication of at least one of a physical location of a user device or a network address of the user device;
collecting, from the one or more messages, information relating to characteristics of the one or more user devices comprising at least one of location information or network address information;

storing the information relating to characteristics of the one or more user devices in an event database;

identifying a home location of a plurality of user devices based on location-based event group information, determined based on the event database, that identifies a plurality of groups of location-based events;

determining that a first location-based event and a second location-based event are associated with a same device ID and that the first location-based event comprises a first network address and the second location-based event comprises a second network address different than the first network address;

at least one of:
- in response to determining that the first network address in the first location-based event matches a home network address associated with a home location group that identifies the home location, including the first location-based event in the home location group; or
- in response to determining that the same device ID has been included in a threshold number of other location-based events comprising the home network address associated with the home location group, including the first location-based event and the second location-based event in the home location group;

including the home location in one or more user profiles associated with the plurality of user devices;

identifying at least one user profile in a user profile database in response to receipt of a request for content to be displayed on at least one of the plurality of user devices;

selecting a content item from a plurality of content items based on the home location included in the at least one user profile; and transmitting the content item over a network to the at least one of the plurality of user devices.

19. The one or more non-transitory computer readable storage media of claim 18, wherein the identifying the home location comprises identifying the home location based on a primary criterion comprising which of the plurality of groups has a largest number of unique device identifications, and a secondary criterion comprising which of the plurality of groups has a largest number of location-based events of the plurality of groups of location-based events.

20. The one or more non-transitory computer readable storage media of claim 18, wherein the operations comprise:
continuously performing k-means clustering operations to form the plurality of groups until a number of groups formed satisfies a distance criterion.

* * * * *